United States Patent
Gulati et al.

(10) Patent No.: US 10,251,158 B2
(45) Date of Patent: Apr. 2, 2019

(54) LOW LATENCY ENHANCEMENTS TO CV2X AUTONOMOUS RESOURCE SELECTION AND RE-SELECTION PROCEDURE FOR VEHICLE-TO-VEHICLE COMMUNICATIONS

(71) Applicant: QUALCOMM INCORPORATED, San Diego, CA (US)

(72) Inventors: Kapil Gulati, Dover, DE (US); Tien Viet Nguyen, Bridgewater, NJ (US); Sudhir Kumar Baghel, Hillsborough, NJ (US); Zhibin Wu, Bedminster, NJ (US); Shailesh Patil, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/928,652

(22) Filed: Mar. 22, 2018

(65) Prior Publication Data

US 2018/0279259 A1    Sep. 27, 2018

Related U.S. Application Data

(60) Provisional application No. 62/476,330, filed on Mar. 24, 2017.

(51) Int. Cl.
*H04B 17/382* (2015.01)
*H04L 5/00* (2006.01)
(Continued)

(52) U.S. Cl.
CPC .......... *H04W 72/02* (2013.01); *H04B 17/382* (2015.01); *H04L 5/006* (2013.01);
(Continued)

(58) Field of Classification Search
CPC ...... H04B 17/382; H04L 5/0001–5/26; H04W 4/40–4/48; H04W 16/02–16/16;
(Continued)

(56) References Cited

U.S. PATENT DOCUMENTS

| | | |
|---|---|---|
| 9,147,294 B1 | 9/2015 | Weinfield |
| 2012/0184321 A1* | 7/2012 | Baldessari .......... H04W 52/267 455/522 |
| 2017/0006580 A1 | 1/2017 | Patil et al. |

OTHER PUBLICATIONS

Huawei et al., "Discussion on RRM Measurements Related to UE Autonomous Resource Selection in V2V," 3GPP Draft, R4-167770, 3rd Generation Partnership Project (3GPP), Mobile Competence Centre, 650, Route Des Lucioles, F-06921 Sophia-Antipolis Cedex, France, vol. RAN WG4, No, Ljubljana, Slovenia, Oct. 10, 2016-Oct. 14, 2016, Oct. 19, 2016 (Oct. 19, 2016), XP051163910, pp. 1-4, Retrieved from the Internet: URL:http://www.3gpp.org/ftp/tsg_ran/WG4_Radio/TSGR4_77/Docs/ [retrieved on Oct. 19, 2016].

(Continued)

*Primary Examiner* — Timothy J Weidner
(74) *Attorney, Agent, or Firm* — Smith Tempel Blaha LLC

(57) ABSTRACT

Low latency enhancements for communication systems, including autonomous driving and/or selection scenarios, are provided. A method for communication includes monitoring communication resources in a communication system, determining a set of candidate resources to use for subsequent transmission of information within a time window such that the time window is minimized based on a desired communication latency parameter that considers at least one or more of communication channel congestion and a priority of transmission, determining a set of lowest energy resources from the set of candidate resources, selecting a low energy resource from the set of lowest energy resources, and transmitting data on the selected low energy resource.

(Continued)

Other aspects, embodiments, and features are also claimed and described.

27 Claims, 13 Drawing Sheets

(51) Int. Cl.
| | |
|---|---|
| *H04W 4/40* | (2018.01) |
| *H04W 4/44* | (2018.01) |
| *H04W 4/46* | (2018.01) |
| *H04W 24/02* | (2009.01) |
| *H04W 24/08* | (2009.01) |
| *H04W 28/02* | (2009.01) |
| *H04W 72/02* | (2009.01) |
| *H04W 72/04* | (2009.01) |
| *H04W 72/06* | (2009.01) |
| *H04W 72/10* | (2009.01) |
| *H04W 84/00* | (2009.01) |
| *H04W 84/18* | (2009.01) |
| *H04W 88/06* | (2009.01) |
| *H04W 92/10* | (2009.01) |

(52) U.S. Cl.
CPC .......... *H04L 5/0064* (2013.01); *H04L 5/0071* (2013.01); *H04W 4/40* (2018.02); *H04W 4/44* (2018.02); *H04W 4/46* (2018.02); *H04W 24/02* (2013.01); *H04W 24/08* (2013.01); *H04W 28/021* (2013.01); *H04W 72/044* (2013.01); *H04W 72/06* (2013.01); *H04W 72/10* (2013.01); *H04W 84/005* (2013.01); *H04W 84/18* (2013.01); *H04W 88/06* (2013.01); *H04W 92/10* (2013.01)

(58) Field of Classification Search
CPC ................. H04W 24/02; H04W 24/08; H04W 28/02–28/065; H04W 72/005–72/14; H04W 74/0808–74/0825; H04W 84/005; H04W 84/18–84/22; H04W 88/02; H04W 88/06; H04W 92/10
See application file for complete search history.

(56) References Cited

OTHER PUBLICATIONS

International Search Report and Written Opinion—PCT/US2018/023911—ISA/EPO—dated Jun. 29, 2018.
Lenovo: "Mechanisms for V2V Resource Allocation," 3GPP Draft, R1-161014, 3rd Generation Partnership Project (3GPP), Mobile Competence Centre, 650, Route Des Lucioles, F-06921 Sophia-Antipolis Cedex, France, vol. RAN WG1, No, St Julian's, Malta, Feb. 15, 2016-Feb. 19, 2016, Feb. 14, 2016 (Feb. 14, 2016), XP051054318, 8 Pages, Retrieved from the Internet: URL:http://www.3gpp.org/ftp/Meetings_3GPP_SYNC/RAN1/Docs/ [retrieved on Feb. 14, 2016].
Lenovo: "Resource Pool for V2V," 3GPP Draft, R1-164646 Resource Pool, 3rd Generation Partnership Project (3GPP), Mobile Competence Centre, 650, Route Des Lucioles, F-06921 Sophia-Antipolis Cedex, France, vol. RAN WG1, No, Nanjing, China, May 23, 2016-May 27, 2016, May 13, 2016 (May 13, 2016), XP051096874, 5 Pages, Retrieved from the Internet: URL:http://www.3gpp.org/ftp/tsg_ran/WG1_RL1/TSGR1_85/Docs/ [retrieved on May 13, 2016].

* cited by examiner

LOW LATENCY ENHANCEMENTS TO CV2X AUTONOMOUS RESOURCE SELECTION AND RE-SELECTION PROCEDURE FOR VEHICLE-TO-VEHICLE COMMUNICATIONS

RELATED APPLICATIONS

This application claims the benefit of U.S. Provisional Patent Application No. 62/476,330, entitled "Low Latency Enhancements to CV2X Autonomous Resource Selection and Re-Selection Procedure For Vehicle-To-Vehicle Communications," filed Mar. 24, 2017, the contents of which are hereby incorporated herein by reference for all applicable purposes and in its entirety as if fully set for the below.

TECHNICAL FIELD

The technology discussed below relates generally to wireless communication systems, and more particularly to establishing a communication channel for vehicle-to-vehicle communications. Certain embodiments enable and provide communication techniques that can include resource allocation to establish one or more communication channels for vehicle-to-vehicle and vehicle-to-everything communications (e.g., in congested scenarios).

INTRODUCTION

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, or may be any other connected device.

When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). An example of an interface over which a UE may directly communicate with another UE, such as in a D2D communication methodology, may be referred to as a PC5 interface, which is a communication interface that allows devices to communicate directly on a sidelink communication channel. A sidelink communication channel is one that is established directly between UEs and which does not necessarily use a base station. Cellular V2X (CV2X) may be used to enhance V2X communication by leveraging existing long term evolution (LTE) communication networks, and advancements to LTE networks, to establish a unified connectivity platform in addition to V2V communication. Vehicle-to-everything (V2X) communications and particularly, CV2X communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments can include monitoring communication resources in a communication system, determining a set of candidate resources to use for subsequent transmission of information within a time window such that the time window is minimized based on a desired communication latency parameter that considers at least one or more of communication channel congestion and a priority of the subsequent transmission, determining a set of lowest energy resources from the set of candidate resources, selecting a low energy resource from the set of lowest energy resources, and transmitting data on the selected low energy resource.

Another aspect of the disclosure provides an apparatus for communication including a user equipment (UE) configured to monitor communication resources in a communication system, the UE configured to determine a set of candidate resources to use for subsequent transmission of information within a time window such that the time window is minimized based on a desired communication latency parameter that considers at least one or more of communication channel congestion and a priority of the subsequent transmission, the UE configured to determine a set of lowest energy resources from the set of candidate resources, the UE configured to select a low energy resource from the set of lowest energy resources, and the UE configured to transmit data on the selected low energy resource.

Another aspect of the disclosure provides an apparatus for communication including a user equipment (UE) configured to monitor communication resources in a communication system, the UE configured to determine a set of candidate resources to use for subsequent transmission of information within a time window such that the time window is minimized based on a desired communication latency parameter that considers at least one or more of communication channel congestion and a priority of the subsequent transmission, the time window minimized based on at least one of a channel busy ratio measurement that is indicative of communication channel congestion and a per packet priority information that is indicative of priority of the subsequent transmission, the UE configured to determine a set of lowest energy resources from the set of candidate resources, the UE configured to select a low energy resource from the set of lowest energy resources, and the UE configured to transmit data on the selected low energy resource.

Another aspect of the disclosure provides a device including means for monitoring communication resources in a communication system, means for determining a set of candidate resources to use for transmission of information within a time window such that the time window is minimized based on a desired communication latency parameter that considers at least one or more of communication channel congestion and a priority of the subsequent transmission, means for determining a set of lowest energy resources from the set of candidate resources, means for selecting a low energy resource from the set of lowest energy resources, and means for transmitting data on the selected low energy resource.

Another aspect of the disclosure provides a non-transitory computer-readable medium storing computer executable code for communication, the code executable by a processor to monitor communication resources in a communication system, determine a set of candidate resources to use for subsequent transmission of information within a time window such that the time window is minimized based on a desired communication latency parameter that considers at least one or more of communication channel congestion and a priority of transmission, determine a set of lowest energy resources from the set of candidate resources, select a low energy resource from the set of lowest energy resources, and transmit data on the selected low energy resource.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
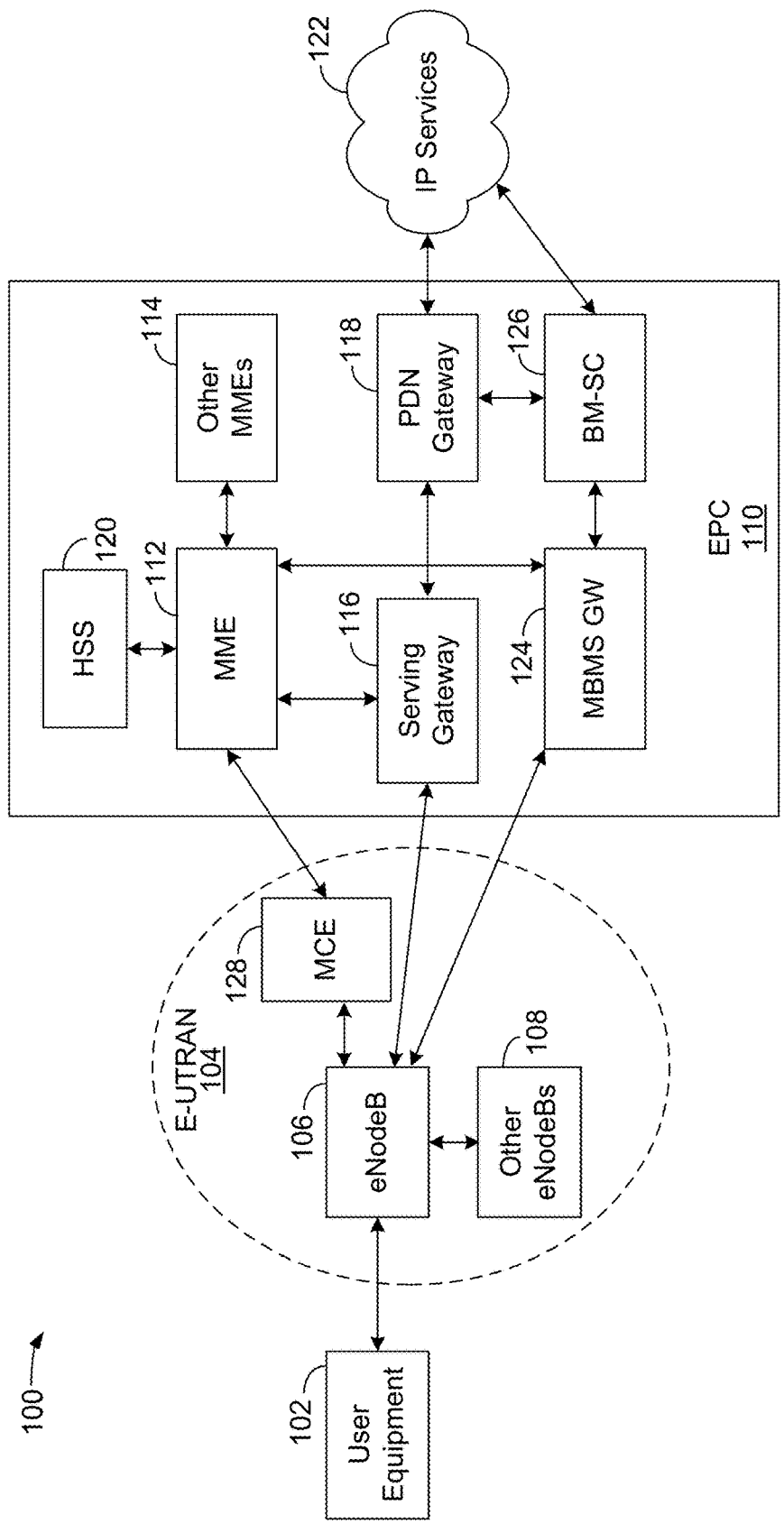
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to enhancing latency performance of CV2X autonomous resource selection and resource reselection. According to some aspects, by deploying timing and selection features discussed herein, balancing low latency requirements with system performance in congested scenarios can be achieved. Tradeoffs between latency versus performance in congested scenarios as discussed herein in more detail can be beneficial in a variety of CV2X or other communication scenarios.

As used herein, the term "NR" corresponds to "new radio" which is a way of referring to a radio interface that may be part of the 5G communication methodology. The term "NR" can be used interchangeably with the term "5G." While certain techniques and technical description may be provided with reference to LTE networks, those skilled in the art will understand that other networks may also be utilized using concepts and principles described (e.g., including 5G or NR networks).

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services.

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102.

UEs can include a wide variety of components and/or devices. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, drone, vehicle, industrial equipment, medical equipment, wearable, entertainment device, recreational device, mammal implantable device, or some other suitable terminology. The UE 102 may also be a vehicle, a drone, an automobile, or another vehicle.

In an exemplary embodiment, the network architecture 100 may also comprise a 5G, or NR, communication architecture, in which the eNB 106 may be referred to as a gNodeB (gNB). As used herein, the terms "base station" and "eNB" may be used interchangeably with the term "gNB."

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
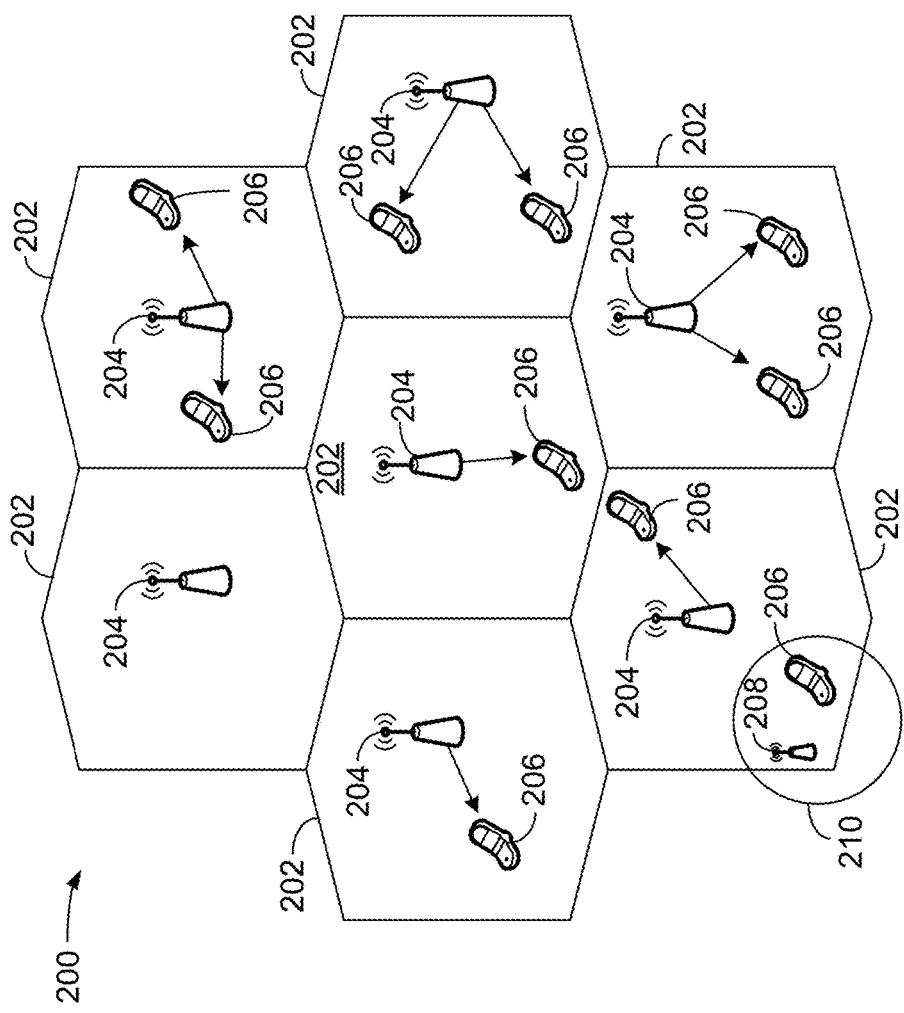
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are favorable. When channel conditions are less favorable, beamforming may be used to focus the transmission energy in one or more directions. This may be achieved by spatially precoding the data for transmission through multiple antennas. To achieve robust coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-PDMA in the form of a DFT-spread OFDM signal to compensate for high peak-to-average power ratio (PAPR).

Figure 3:
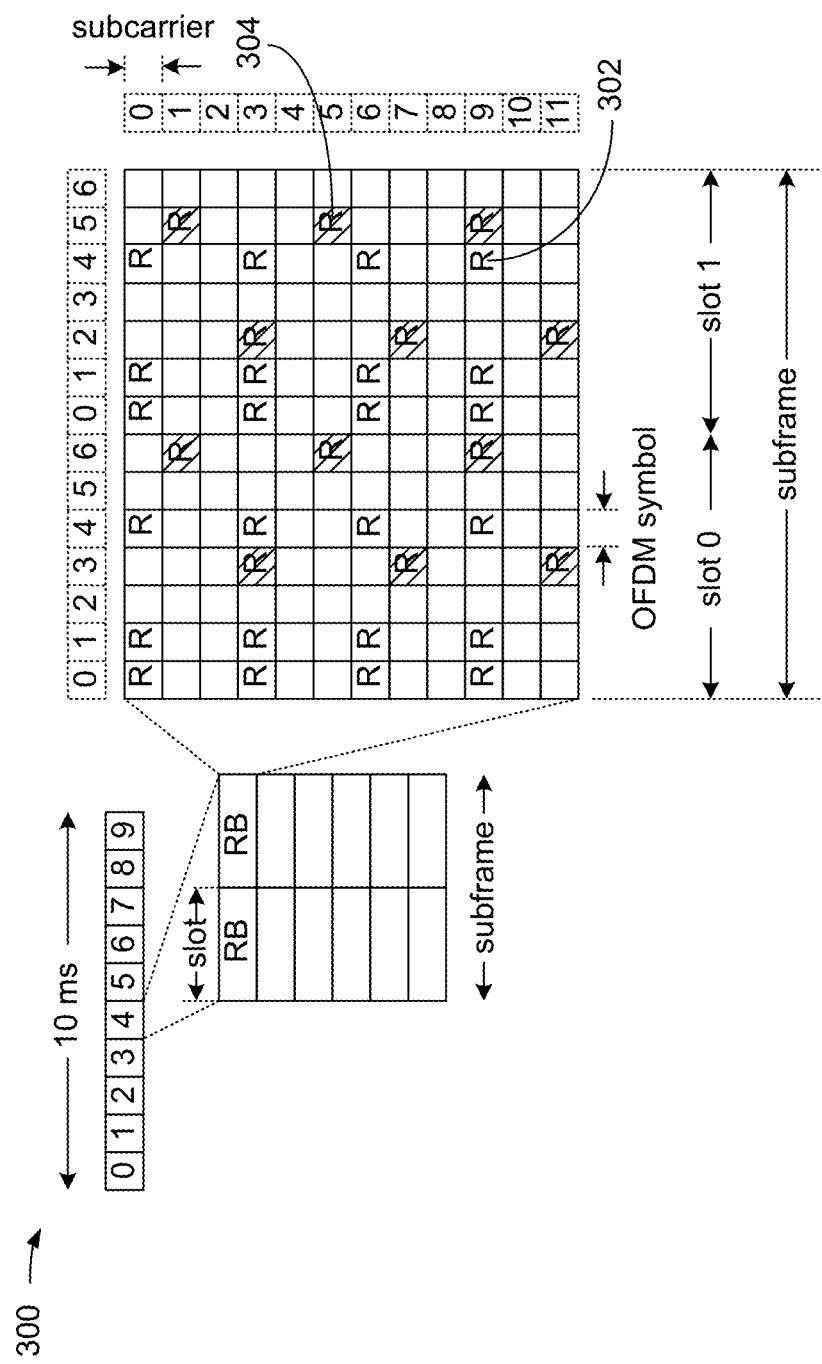
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements.

In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
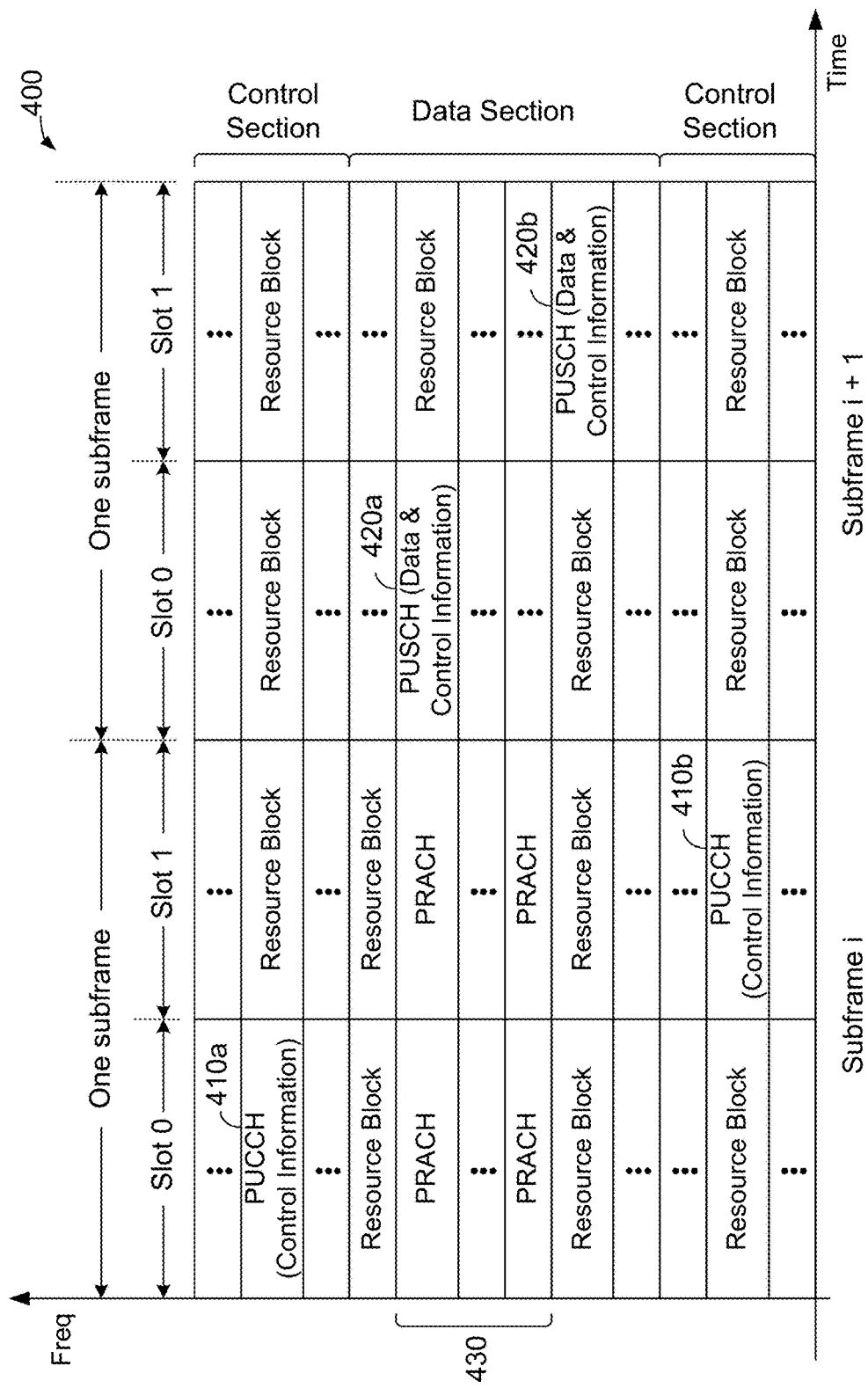
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. A starting frequency can be specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
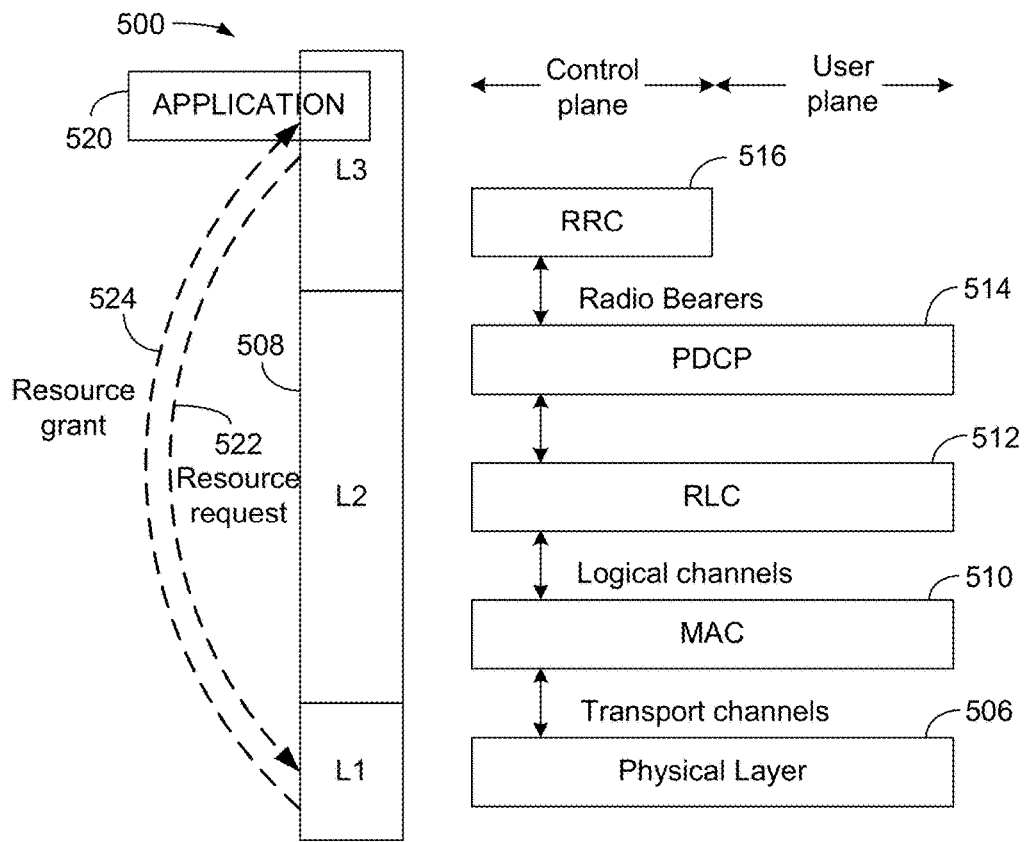
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506. Layer 3 (L3 Layer) may include one or more applications, and a radio resource control (RRC) sublayer 516.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. The UE may have several upper layers above the L2 layer 508 including a network layer (e.g., IP layer) (not shown) that is terminated at the PDN gateway 118 on the network side, and an application layer 520 that is terminated at the other end of the connection (e.g., far end UE, server, etc.). In an exemplary embodiment, the application layer 520 may request communication resources from the physical layer 506 (layer L1), shown using a dotted line 522, and may receive resource grants from the physical layer 506 (layer L1), shown using a dotted line 524. Although for purposes of clarity such resource requests are conceptually indicated by dotted lines 522 and 524 between the L1 layer and the L3 layer, one of ordinary skill in the art understands that the signals underlying such a resource request and resource grant may reach physical layer 506 via the intervening L2 layer.

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
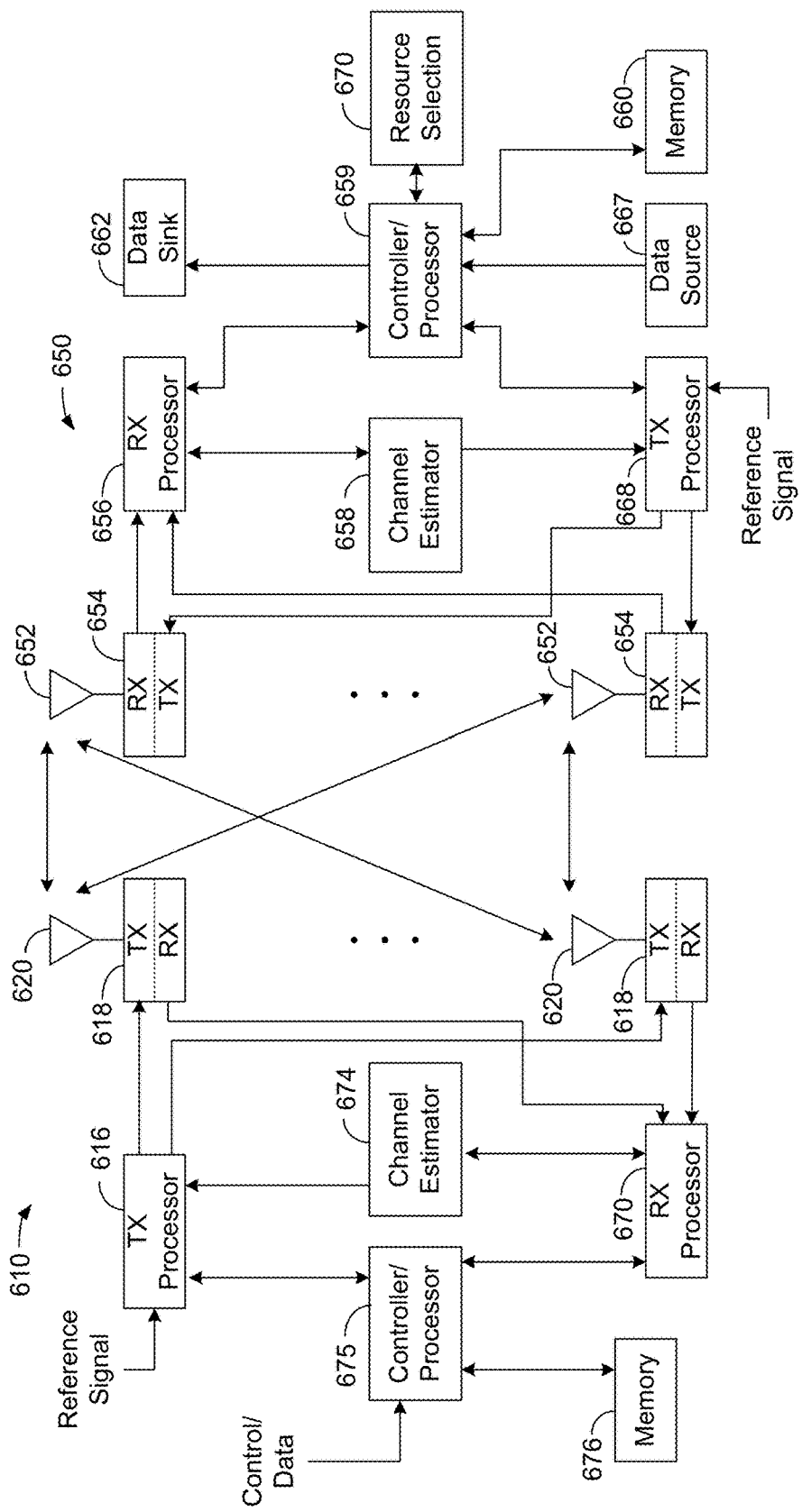
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In an exemplary embodiment, the controller/processor 659 may be coupled to resource selection logic 670. The resource selection logic 670 may include one or more software, hardware, firmware, logic, or other components that may be configured to evaluate, process, assign, select, reselect, or otherwise allow the UE 650 to determine availability of and to select resources on which to transmit information.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
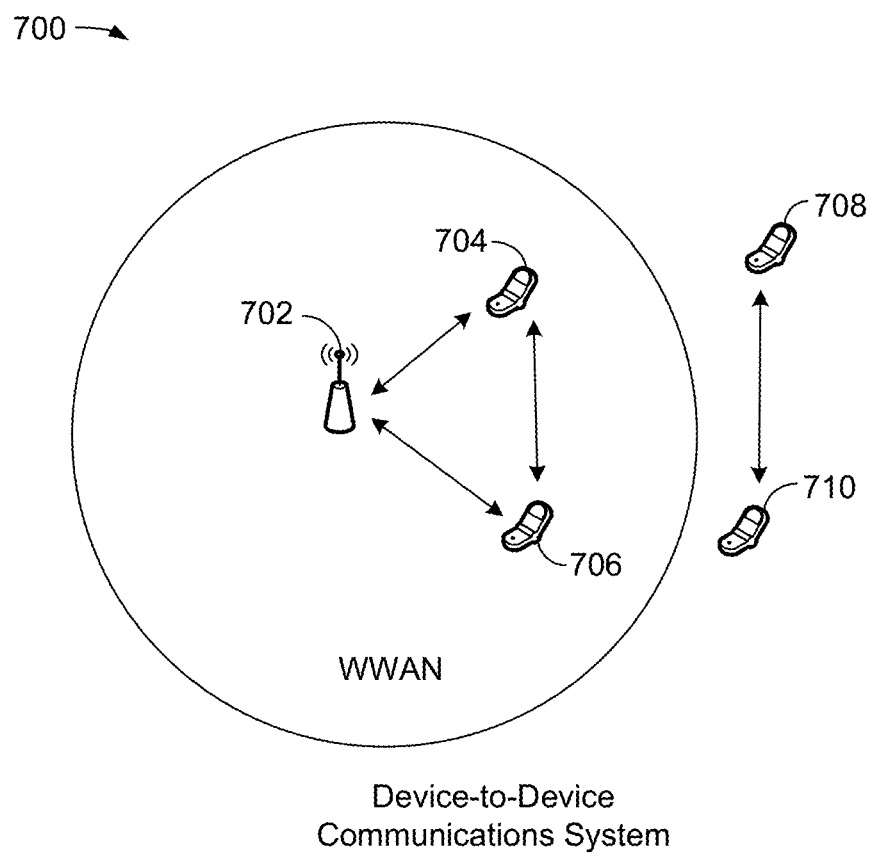
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system (as shown and described in FIG. 1 and in FIG. 2), such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system and when integrated with a cellular communication system, may be referred to as a CV2X communication system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. Yet one of ordinary skill in the art would understand that the exemplary methods and apparatuses are applicable more generally to a variety of other wireless device-to-device communication systems or communication networks such as 5G and beyond.

Figure 8:
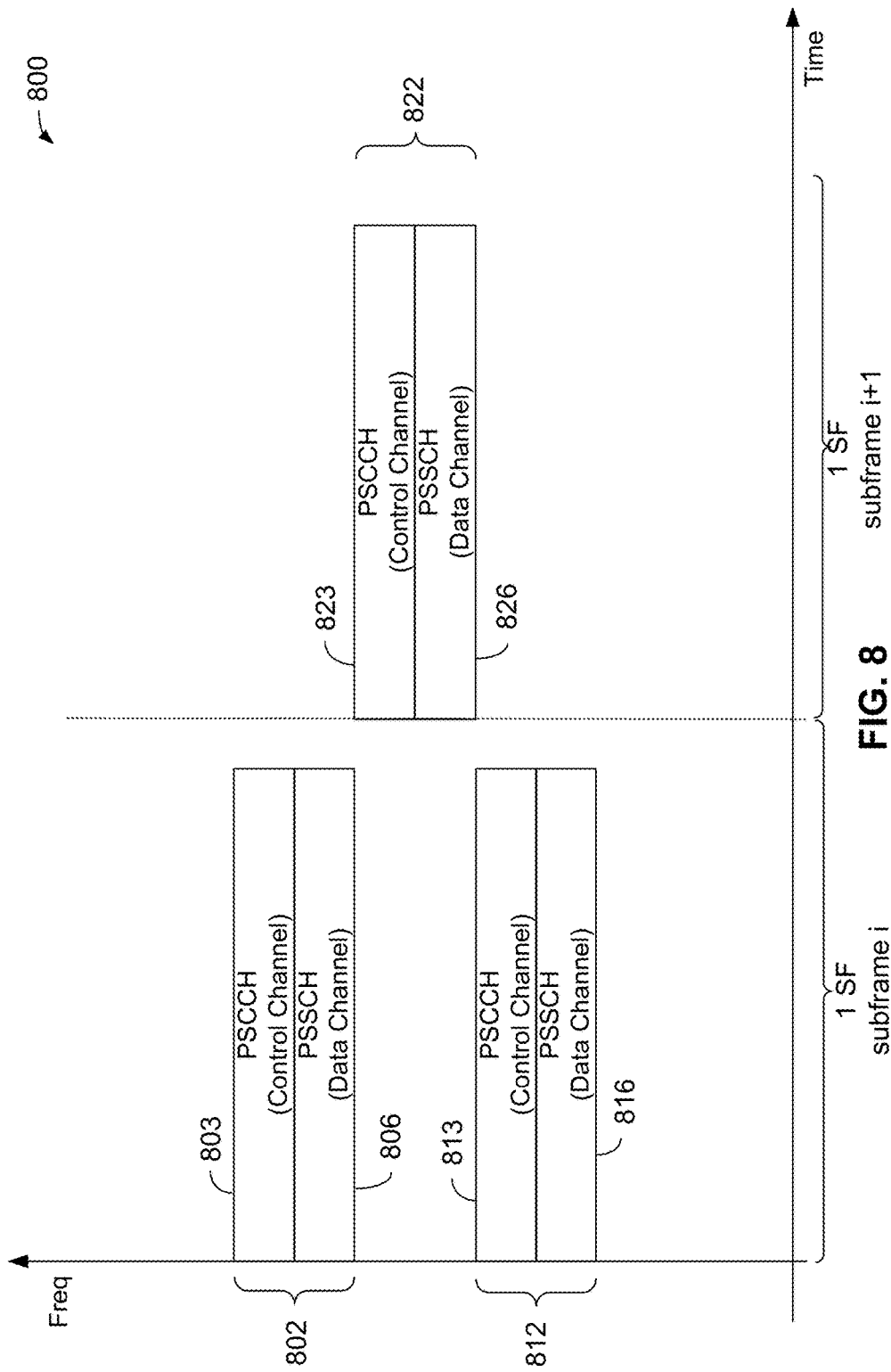
FIG. 8 is a diagram illustrating an example of a communication frame structure, in accordance with various aspects of the present disclosure.

FIG. 8 is a diagram illustrating a data structure 800 in accordance with various aspects of the present disclosure. The horizontal axis shows time increasing to the right and the vertical axis shows frequency increasing upwardly. In an exemplary embodiment, the data structure 800 may comprise a number of time and frequency radio resources that can be used for direct vehicle to vehicle (V2V) communication. These resources are generally referred to as "sidelink" resources and are used to communicate over a "sidelink channel" whereby a vehicle can communicate directly with another vehicle or object.

The data structure 800 may comprise some or all of a sidelink communication and may also be referred to as a communication frame. In an exemplary embodiment, the data structure 800 comprises a first subframe, subframe i, and a second subframe, subframe i+1. In an exemplary embodiment, the first subframe, subframe i, may comprise a transmission 802 from a first exemplary vehicle, and a transmission 812 from a second exemplary vehicle. In an exemplary embodiment, the transmission 802 comprises a physical sidelink control channel (PSCCH) communication 803 and a physical sidelink shared channel (PSSCH) (data channel) communication 806. In an exemplary embodiment, the transmission 1002 comprises a control channel having control information (PSCCH 1003) indicating the resource blocks, modulation/coding scheme, etc., used by the PSSCH data channel transmission 806.

Similarly, in an exemplary embodiment, the transmission 812 comprises a physical sidelink control channel (PSCCH) communication 1013 and a physical sidelink shared channel (PSSCH) (data) communication 816. In an exemplary embodiment, the transmission 812 comprises a control channel having control information (PSCCH 1013) indicating the resource blocks, modulation/coding scheme, etc., used by the PSSCH data transmission 816.

In an exemplary embodiment, the second subframe, subframe i+1, may comprise a transmission 822 from a third exemplary vehicle. In an exemplary embodiment, the transmission 822 comprises a physical sidelink control channel (PSCCH) communication 823 and a physical sidelink shared channel (PSSCH) (data channel) communication 826. In an exemplary embodiment, the transmission 822 comprises a control channel having control information (PSCCH 823) indicating the resource blocks, modulation/coding scheme, etc., used by the PSSCH data channel transmission 826.

Figure 9:
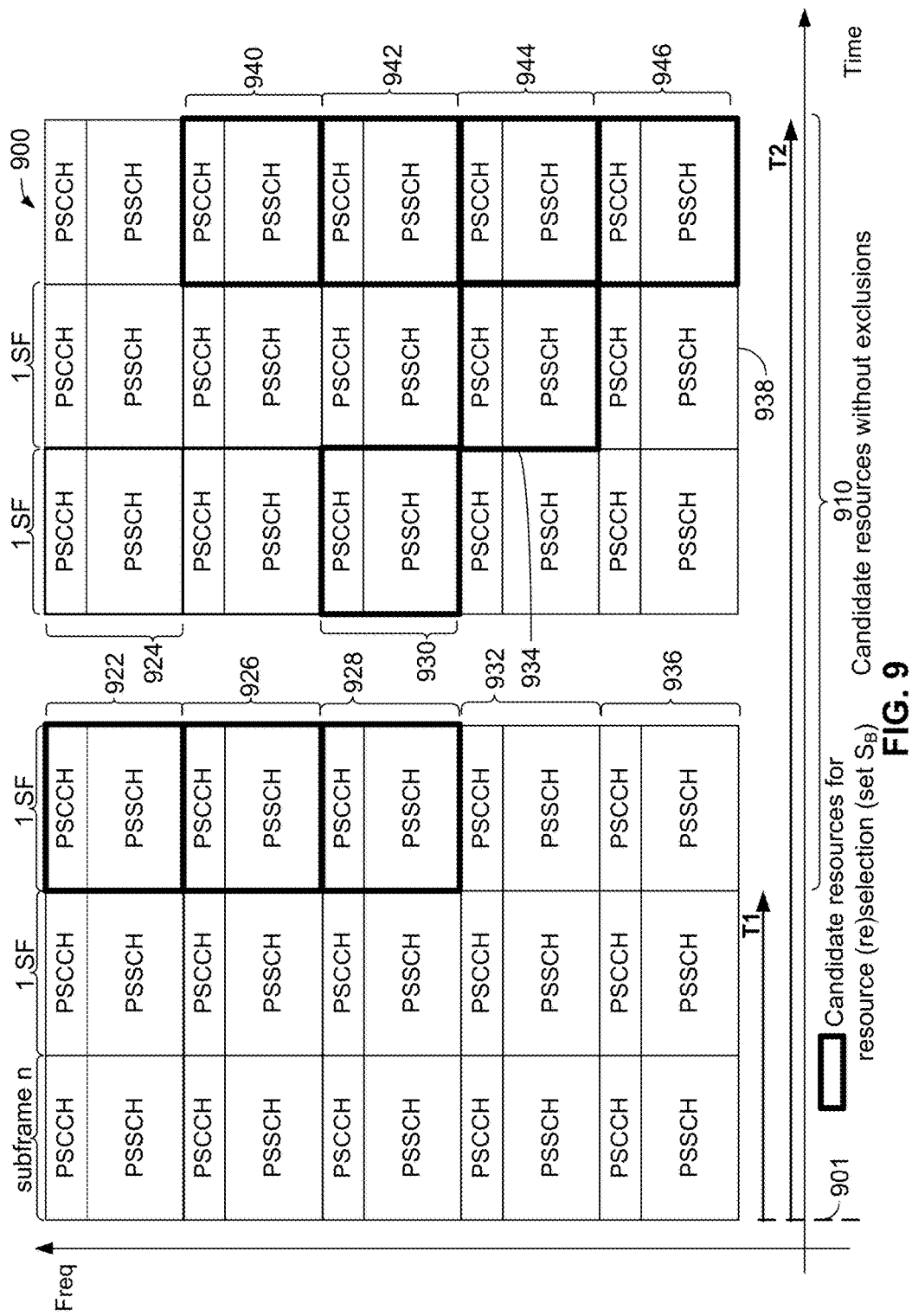
FIG. 9 is a diagram illustrating an example of a communication frame structure, in accordance with various aspects of the present disclosure.

FIG. 9 is a diagram illustrating a data structure 900 in accordance with various aspects of the present disclosure. The data structure 900 includes an exemplary description of candidate resource selection and reselection. Exemplary resources include exemplary PSCCH control channels and PSSCH data channels; however, other resources may also be used. The horizontal axis shows time increasing to the right and the vertical axis shows frequency increasing upwardly.

A time 901 refers to a trigger time for resource selection or reselection at which a packet arrives at a subject UEs application layer at subframe "n" for transmission.

An autonomous resource selection and re-selection procedure for LTE and CV2X communication is defined that is broadly based on the following steps.

1. Continuously sensing (e.g., continually monitoring for occupied and non-occupied resources and the energy received associated with the monitored resources) the set of time and frequency resources over a period time (for example, over a 1 second period of time, or another configurable period of time). The monitoring for occupied and non-occupied resources and the energy received associated with the monitored resources may be continuous, may be continuous over the example period of time, may be discontinuous, or may be selectable or adjustable, based on a number of configuration parameters.

2. When a packet arrives at a subframe n, a UE determines a set of candidate resources to choose for the packet's transmission within a time window, or time interval, of [n+$T_1$, n+$T_2$], where "n" refers to subframe n in FIG. 9. The time $T_1$ is chosen to allow for a UE processing delay with $T_1 \leq 4$ subframes. The time $T_2$ is chosen to meet a latency objective for the intended, or subsequent, transmission of this packet, and, in an exemplary embodiment, may be $20 \leq T_2 \leq 100$ subframes, as an example. As used herein, the term "intended" refers to a UE receiving a packet for transmission (e.g., at subframe n), selecting the appropriate resource as described herein for transmission of that packet, and subsequently transmitting that packet. In an exemplary embodiment, the desired communication latency parameter may comprise the maximum latency desired for transmission of the packet having the communication information. The resources labeled 910 refer to a set of candidate single-subframe resources within the window [n+$T_1$, n+$T_2$] that meet the UEs desired latency objective.

A candidate single-subframe resource (R) for PSSCH transmission $R_{x,y}$ is defined as a set of $L_{subCH}$ contiguous sub-channels with sub-channel x+j in subframe $t_y^{SL}$ where j=0, . . . , $L_{subCH}$1. The UE assumes that any set of $L_{subCH}$ contiguous sub-channels included in the corresponding PSSCH resource pool within the time interval [n+$T_1$,n+$T_2$] corresponds to one candidate single-subframe resource, where selections of $T_1$ and $T_2$ are determined by the UE implementation under the general constraint of $T_1 \leq 4$ and $20 \leq T_2 \leq 100$, in this example. The UEs selection of $T_2$ preferably fulfills the UEs latency objective. The total number of the candidate single-subframe resources is denoted by $M_{total}$. The union of all the candidate single-subframe resources are denoted as set $S_A$. The set $S_A$ may be generated by the controller/processor 659 and saved in the memory 660 of FIG. 6.

Resources that are adjacent in frequency may be referred to as being in contiguous sub-channels, with a sub-channel referring to a frequency span. For example, the resources 922 and 926 are considered to be located in contiguous sub-channels, where each resource (922 and 926 in this example), comprises a frequency span.

3. The UE then determines a subset $S_B$ of resources within the window [n+$T_1$, n+$T_2$] (i.e., a subset $S_B$ of the set $S_A$) that the UE determines to not be reserved for transmissions by other UEs in the proximity of the subject UE. To determine the set of resources $S_B$, the subject UE first excludes from the set $S_A$ any occupied resources, and any resources on which it expects a collision from another UEs transmission based on the decoded control information from its previous transmissions that indicate the future resource reservations by that UE. The resources are excluded if a collision is expected, and if the reference signal received power (RSRP) of the received transmission exceeds a threshold, where the threshold depends on the relative priority of the transmission by the other UE and the priority of the subject UEs own intended transmission. Furthermore, the subject UE is expected to exclude any resource that it was unable to monitor in the past to avoid any potential collisions. The set $S_B$ may be generated by the controller/processor 659 and saved in the memory 660 of FIG. 6.

As an example using FIG. 9, the subject UE may determine to exclude the resources 924, 932, 936, and 938 within the set of resources 910 based on received transmissions from other UEs in the subject UEs proximity For example, the subject UE may determine the occupied resources within the set of candidate resources based on received control information indicating resource reservation information. In an exemplary embodiment, a minimum and a maximum limit on the time window T2 may be a function of a usage level based on the energy of remaining candidate resources from the set of candidate resources after excluding occupied resources.

After resource exclusions, the UE then ranks the remaining resources within a set ($S_A$) based on the received energy (RSSI (received signal strength indicator)) measurements on average over the sensing period. The UE then forms the set $S_B$ by choosing the lowest energy resources from the set $S_A$ until the number of resources within the set $S_B$ become greater or equal to $0.2 \cdot M_{total}$, in this example. Other multipliers of $M_{total}$ are possible. As an example using FIG. 9, the UE may determine the resources 922, 926, 928, 930, 934, 940, 942, 944, and 946 (indicated in bold) to have the lowest measured RSSI energy within the set of candidate resources 910 after exclusion of the resources 924, 932, 936, and 938. In this manner, the resources 922, 926, 928, 930, 934, 940, 942, 944, and 946 are determined to be the set of candidate resources (lowest energy resources) available for resource selection and/or re-selection (i.e., the set $S_B$) for transmission of the intended packet.

4. The subject UE then chooses a low energy resource from the set $S_B$. For example, the subject UE may choose resources 930 for transmission of the communication within the time period $T_2$. The resource 930 may be considered a low energy resource, having a received energy lower than other resources in the set $S_B$ or having energy not necessarily the lowest in the set $S_B$ but sufficiently low for transmission of the communication packet within the time period $T_2$. In an exemplary embodiment, the resource 930 may have a low received energy, and may be considered a low latency resource. In an exemplary embodiment, selecting the low energy resource, such as resource 930, from the set of lowest energy resources as the resource for transmission leads to the lowest latency of transmission for the subject packet.

To further describe step 2 above, in the window of [n+$T_1$, n+$T_2$], the choice of $T_1$ and $T_2$ may be determined, at least in part, by the UE implementation within certain constraints. The time $T_2$ is related to the desired latency and, in an exemplary embodiment, the best worst-case latency is on the order of about 20 ms. In other words, if the UE desires a latency $<=10$ ms, then this latency may not be guaranteed as only latencies $<=T_2$, i.e., no less than 20 ms, may be guaranteed in this example where $T_2>=20$ ms.

To support low latency CV2X, V2X, V2V and other communications, a latency below 20 ms, i.e., a $T_2$ of less than 20 ms, in desired. One way of achieving low latency is to allow for $20>T_2>=4$ (for example) and leave the choice of $T_2$ to the UE implementation. However, this approach may present a problem at the system level in congested scenarios. In congested scenarios, a low latency objective drives the subject UE to set a resource selection, or (re)selection window that is small ($T_2$ is small, for example, 10 ms) and as such, the subject UE may not be able to locate any suitable resource (i.e., a resource that is not being used by another UE and that has low received energy). Thus, the best resource set in the small window of 10 ms in this example may not be very good (from a system viewpoint) and using one of these resources may likely cause a collision with other UE transmissions on that resource and degrade system performance. Therefore, it is desirable to balance the desirability of low latency with system performance, particularly in congested scenarios.

With regard to latency reduction (reduction of $T_2$), the minimum value of $T_2$ can be reduced to support latency reduction at the physical layer (Layer 1). The UE configuration and pre-configuration can be based on the selection of a minimum value of $T_2$ being supported. The minimum value of $T_2$ may be selected from a set of values. The set of values may include at least 20 ms, and a value lower than 20 ms.

In a first exemplary embodiment of optimizing (minimizing) $T_2$, the minimum value of $T_2$ allowed to be used by the subject UE may be derived as a function of the channel busy ratio (CBR) measured at the subject UE at the time of resource selection and reselection. In an exemplary embodiment, the function of the CBR measurement at the subject UE at the time of resource selection or reselection may be based on at least one of pre-configuration within the subject UE or dynamic configuration via a received configuration message from a base station.

In an exemplary embodiment, the function of the CBR measured at the subject UE at the time of resource selection or reselection may be dependent on the priority of the packet, for example, the ProSe Per Packet Priority (PPPP), or other packet prioritization criteria. For example, the time window $T_2$ may be minimized based on the per packet priority information that is indicative of a priority of the intended subsequent transmission.

In an exemplary embodiment, the function of the CBR measured at the subject UE at the time of resource selection or reselection may depend on the pool of transmission resources being used for transmission.

In an exemplary embodiment, the upper limit on $T_2$ may also be a function of the CBR (so min and/or max limit of $T_2$ as a function of CBR can be configured).

In an exemplary embodiment, the channel busy ratio (CBR) is a measure of the congestion level of the channel measured by the subject UE. The UE may adapt its transmission parameters as a function of the measured CBR prior to each transmission of the UE. The set of transmission parameters to be adapted and the range (min and max values as applicable) may be configured using a pre-configuration/ RRC (radio resource control) message and may be in the form of a lookup table 1100 as shown in FIG. 11.

Figure 11:
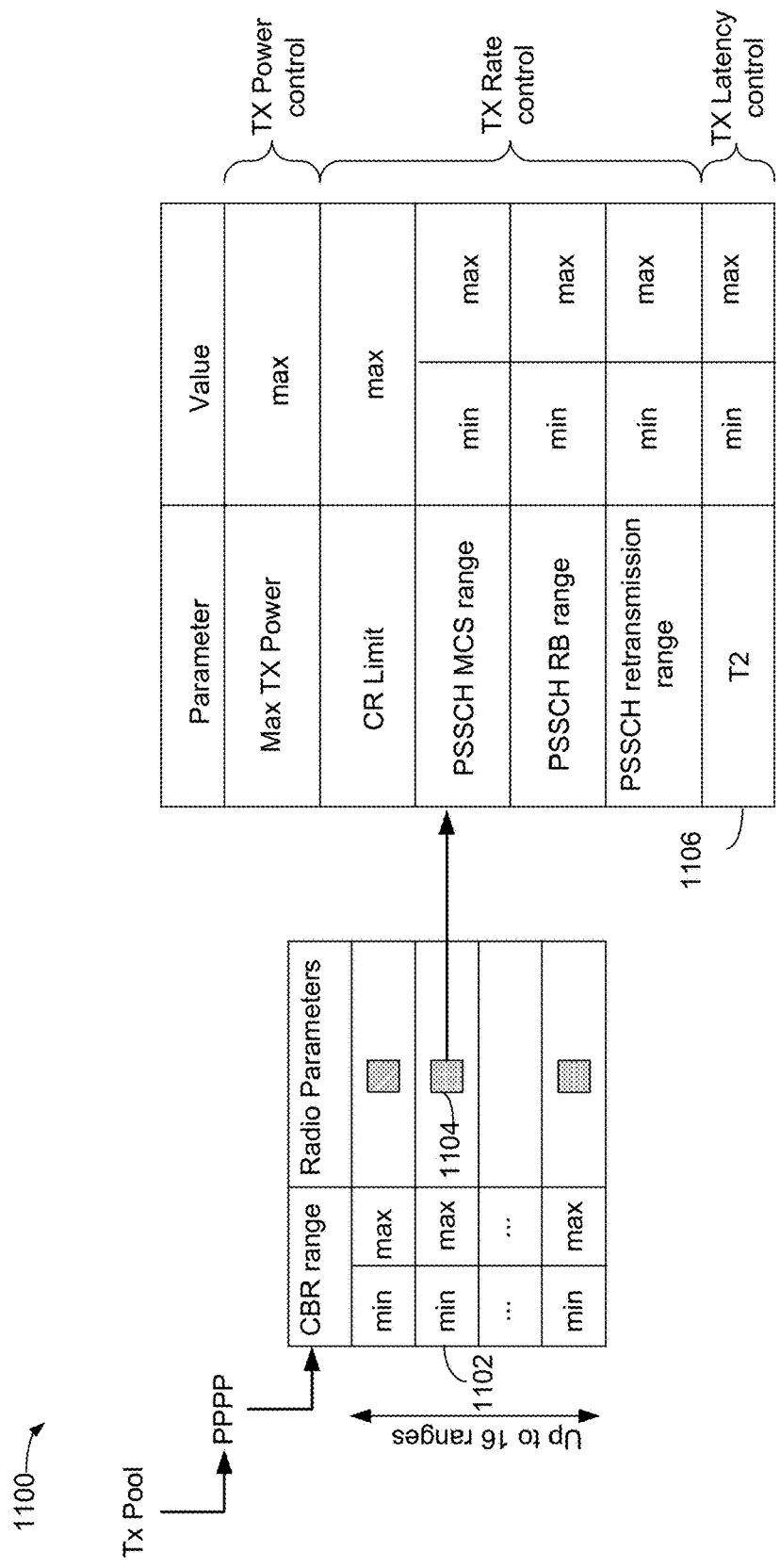
FIG. 11 is a lookup table showing exemplary pre-configuration/RRC (radio resource control) information.

In accordance with an exemplary embodiment, the lookup table 1100 in FIG. 11 shows an example of the measured CBR having a value between the minimum and maximum of the CBR range configuration corresponding to 1102, and the selected radio parameters in 1104 that the UE should use for its transmissions, and where the set of radio parameters include the additional parameter configuration 1106 that corresponds to the minimum value for the parameter "$T_2$".

The exemplary lookup table in FIG. 11 may be (pre) configured independently for different priority (PPPP) of transmission. As an example configuration:

PPPP-1 (high packet priority)
0<CBR<0.5 T2min=10
0.5<CBR<1 T2min=12
PPPP_2 (low packet priority)
0<CBR<0.3 T2min=10
0.3<CBR<0.5 T2min=12
0.5<CBR<1 T2min=20

In this example, as congestion increases, the minimum value of $T_2$ is also configured to increase to achieve a tradeoff between performance (i.e., achieved by setting a larger time window) and latency (i.e., achieved by setting a smaller time window to achieve a latency performance objective). If an intended transmission is for a high priority packet, then $T_2$ is increased only marginally as CBR increases to ensure that the high priority packets are transmitted with lower latency (as the high priority is also indicative of the latency objective). If the intended transmission is for a low priority packet, then the minimum value of $T_2$ allowed is increased as CBR increases to provide the tradeoff between performance and latency.

Another example configuration may set the minimum value of $T_2$ to depend only on the priority (PPPP) of the transmission and independent of the CBR measured (e.g. the value may be configured as the same for CBR ranges, or a separate PPPP to $T_2$ (min/max) value lookup table maybe configured or preconfigured).

In a second exemplary embodiment of optimizing (minimizing) $T_2$, a subject UE may begin with a low value of $T_2$, for example, 10 ms, and then autonomously increase the time $T_2$ if it cannot locate a number of resources (for example, [X]% of resources) with received energy less than a configured or pre-configured threshold, within the time $T_2$. Said differently, if the size of the set of lowest energy resources is less than a configured threshold (X %) of the size of the candidate resources, then the UE will autonomously increase the time $T_2$. For example, the time $T_2$ may be increased in steps (for example, in steps of 1 subframe period at a time) until the set of candidate resources with energy less than the threshold is greater than or equal to [X]%. Starting with a minimum time window the subject UE may then increase the time window if the set of resources having energy less than a threshold is less than a configured threshold (X %).

In this exemplary embodiment, the subject UE can choose $T_2$<=a limit, where the limit is either specified in the specification or configured (or pre-configured) as an RRC parameter. The subject UE may choose a desired $T_2$ within the limit to meet its latency objective. In the resource selection or reselection step; however, if the subject UE cannot identify more than [X]% of candidate resources that have energy less than a threshold, then the subject UE determines that it does not have a good set of candidate resources and may degrade the system performance beyond a tolerable level. In this example, the subject UE thus sacrifices latency in favor of system performance and increases the time $T_2$ until the candidate set of resources is larger than [X]% of the original set of resources (e.g., X=20%).

In a third exemplary embodiment of optimizing (minimizing) $T_2$, a subject UE chooses the lowest latency resource within the set of lowest energy resources.

In a fourth exemplary embodiment of optimizing (minimizing) $T_2$, in a variant of the first exemplary embodiment for optimizing $T_2$, the min (and/or max) limits on $T_2$ are instead a function of a new measure that may be referred to as a "usage level" based on the UE sensing the energy of remaining candidate resources from the sensing results after excluding resources expected to be occupied (e.g., based on decoding of the control channel indicating these resources will be occupied by another UEs transmission).

In an exemplary embodiment, data corresponding to a plurality of information packets with a plurality of different priorities may be transmitted on the selected low energy resource over time; and the time window, $T_2$, may be minimized based on a highest per packet priority of the plurality of different priorities anticipated to be transmitted using the selected low energy resource over time.

In an exemplary embodiment, data corresponding to a plurality of information packets with a plurality of different priorities may be transmitted on the selected low energy resource over time, and the time window $T_2$ may be minimized based on an average per packet priority of the plurality of different priorities anticipated to be transmitted using the selected low energy resource over time.

Figure 10:
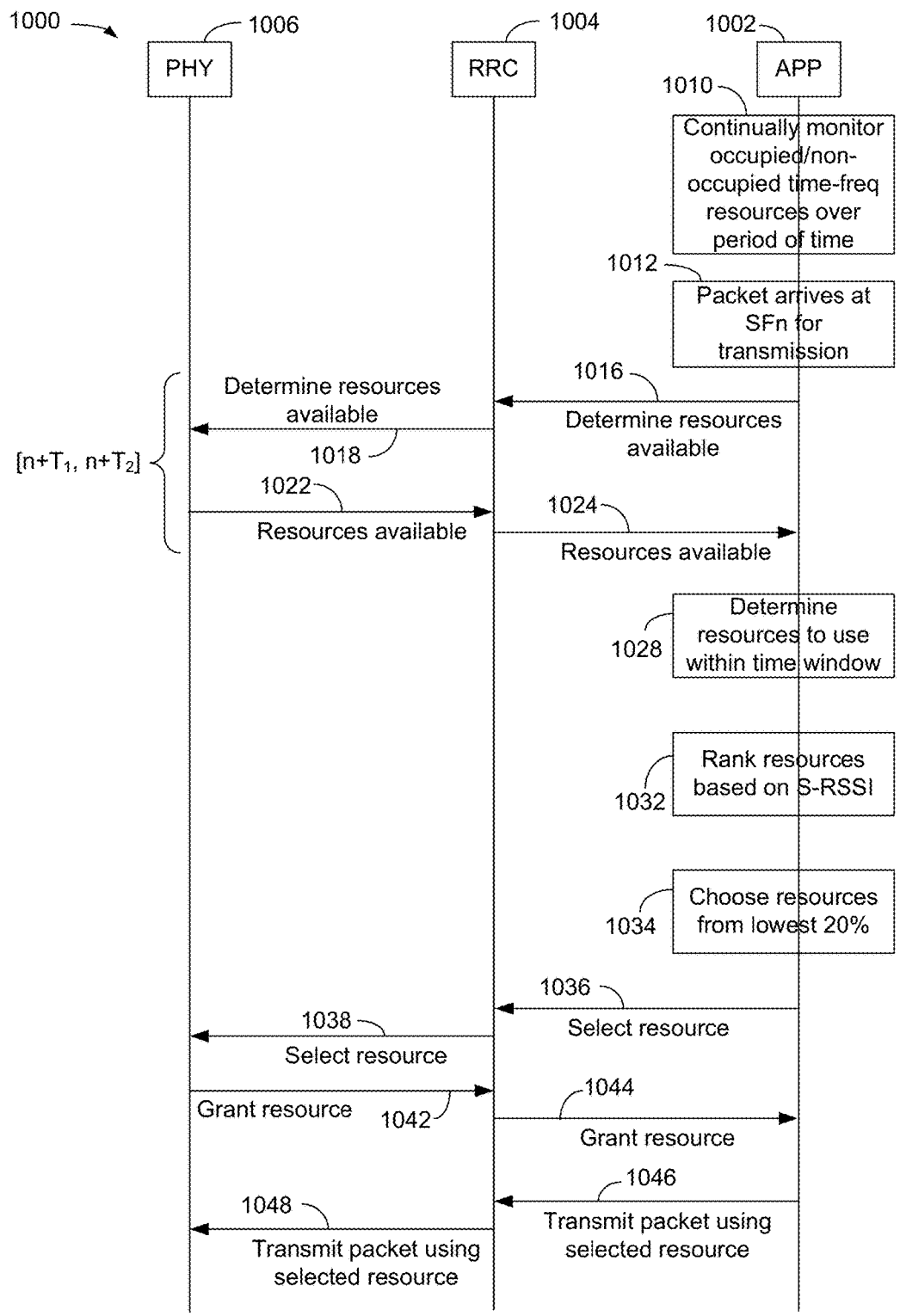
FIG. 10 is a call flow diagram illustrating an exemplary embodiment of the present disclosure.

FIG. 10 is a call flow diagram illustrating an exemplary embodiment of the present disclosure.

A UEs application layer is shown at 1002, a UEs RRC sublayer is shown at 1004, and a UEs physical layer is shown at 1006.

At block 1010, the application layer 1002 continually monitors for occupied and non-occupied time and frequency resources over a period of time. The period of time may be configurable, and in an exemplary embodiment, may be 1 second.

In block 1012, a packet arrives at the application layer 1002 at subframe n for transmission.

In call 1016, the application layer 1002 calls the RRC sublayer to determine available resources.

In call 1018, the RRC sublayer 1004 calls the physical layer 1006 to determine available resources.

In call 1022, the physical layer 1006 informs the RRC sublayer 1004 of available resources. These resources may be the candidate resources for resource selection or reselection described in FIG. 9.

In call 1024, the RRC sublayer 1004 informs the application layer 1002 of the available resources.

In block 1028, the application layer 1002 determines the resources to use within the time window $[n+T_1, n+T_2]$ described above.

In block 1032, the application layer 1002 ranks the available resources based on S-RSSI, or on another criteria.

In block 1034, the application layer 1002 chooses resources. For example, the application layer 1002 may choose resources from the lowest 20% of S-RSSI as described above.

In call 1036, the application layer 1002 calls the RRC sublayer 1004 to select the chosen resources.

In call 1038, the RRC sublayer calls the physical layer 1006 to select the chosen resources.

In call 1042, the physical layer 1006 calls the RRC sublayer 1004 to grant the resource request.

In call 1044, the RRC sublayer 1004 informs the application layer 1002 of the resource grant.

In call 1046, the application layer 1002 calls the RRC sublayer 1004 to transmit the packet using the selected resource.

In call 1048, RRC sublayer calls the physical layer 1006 to transmit the packet on the selected resource.

Figure 12:
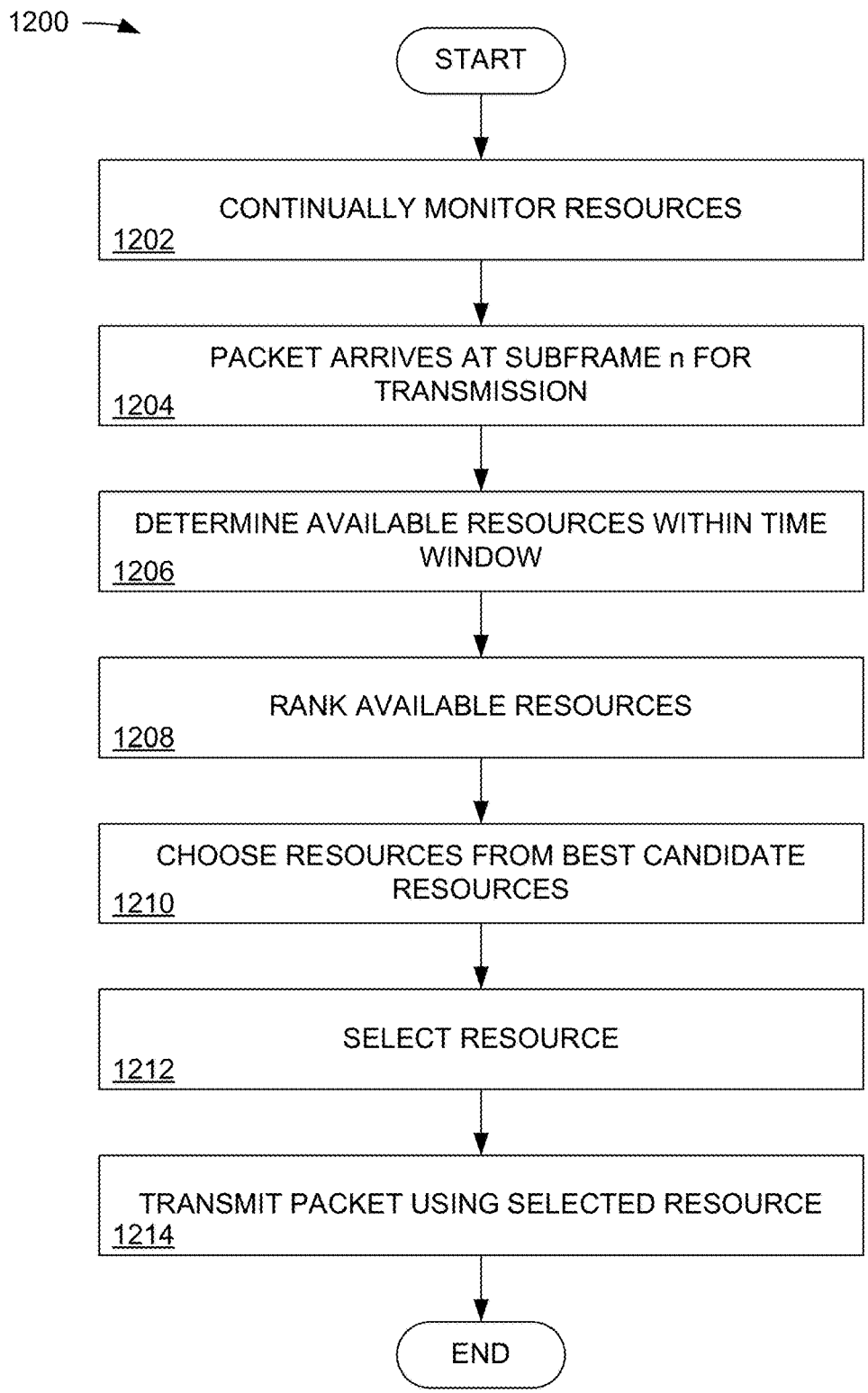
FIG. 12 is a flow chart illustrating an example of a method for communication, in accordance with various aspects of the present disclosure.

FIG. 12 is a flow chart 1200 illustrating an example of a method for communication, in accordance with various aspects of the present disclosure. The blocks in the method 1200 may be performed in or out of the order shown. One or more of the blocks in the method 1200 may be performed in parallel with one or more other blocks in the method 1200.

In block 1202, a subject UE continually monitors available resources for transmission of data packets.

In block 1204, a packet arrives for transmission at subframe n.

In block 1206, the subject UE determines available resources within the time window $[n+T_1, n+T_2]$.

In block 1208, the UE ranks the available resources.

In block 1210, the UE chooses resources from the best available candidate resources.

In block 1212, the UE selects the chosen resources.

In block 1214, the UE transmits the packet using the selected resource.

Figure 13:
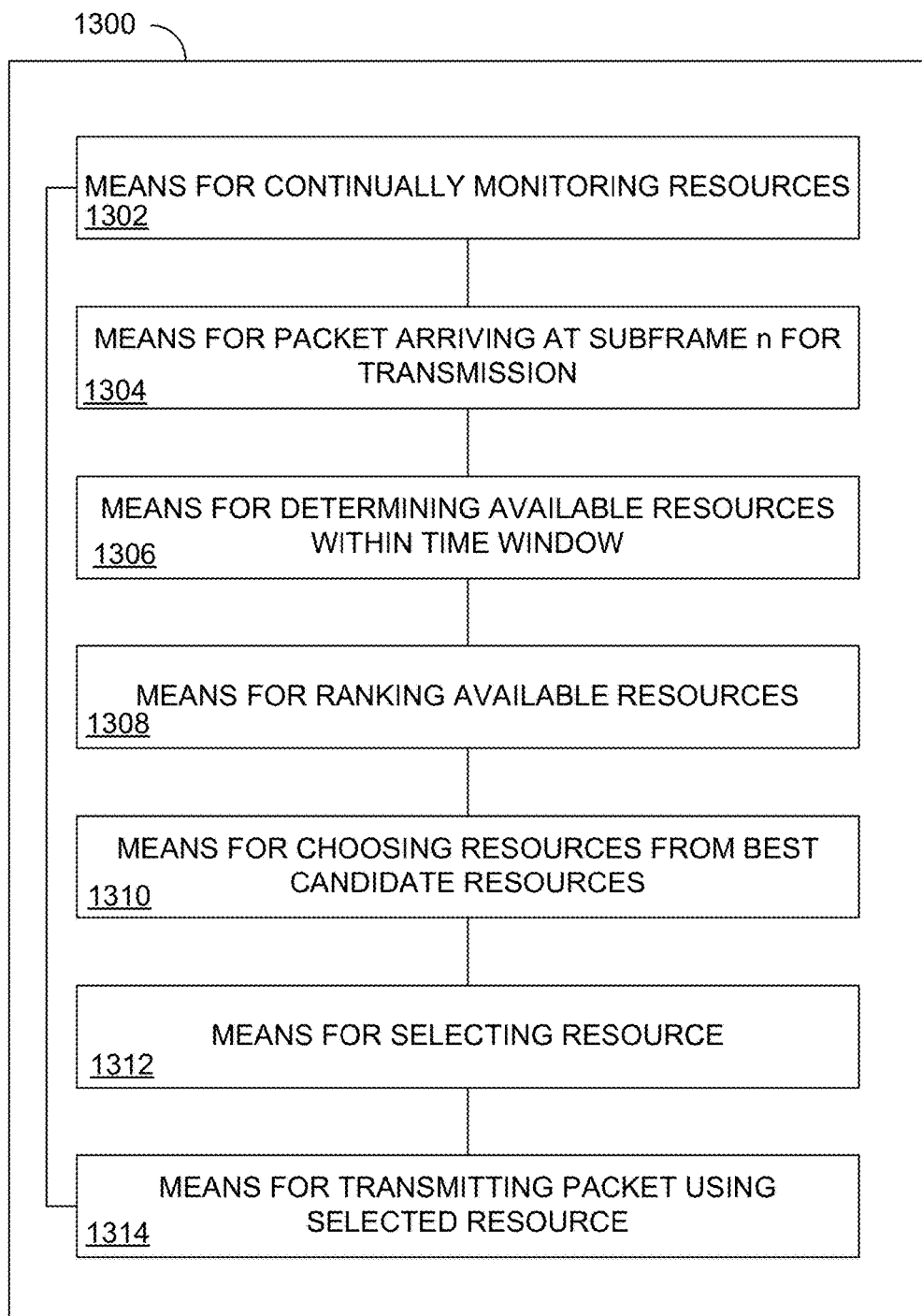
FIG. 13 is a functional block diagram of an apparatus for a communication system in accordance with various aspects of the present disclosure.

FIG. 13 is a functional block diagram of an apparatus 1300 for a communication system in accordance with an exemplary embodiment of the disclosure. The apparatus 1300 comprises means 1302 for continually monitoring resources. In certain embodiments, the means 1302 for continually monitoring resources can be configured to perform one or more of the functions described in operation block 1202 of method 1200 (FIG. 12). In an exemplary embodiment, the means 1302 for continually monitoring resources may comprise the UE 650 (FIG. 6) monitoring available transmission resources using, for example, the controller/processor 659, RX processor 656, and the resource selection logic 670 of FIG. 6.

The apparatus 1300 further comprises means 1304 for determining that a packet arrives for transmission at subframe n. In certain embodiments, the means 1304 for determining that a packet arrives for transmission at subframe n can be configured to perform one or more of the functions described in operation block 1204 of method 1200 (FIG. 12). In an exemplary embodiment, the means 1304 for determining that a packet arrives for transmission at subframe n may comprise the UE 650 (FIG. 6) determining that a communication packet is to be transmitted using, for example, the controller/processor 659, the data source 667, and the resource selection logic 670 of FIG. 6.

The apparatus 1300 further comprises means 1306 for determining resources available within a time window. In certain embodiments, the means 1306 for determining resources available within a time window can be configured to perform one or more of the functions described in operation block 1206 of method 1200 (FIG. 12). In an exemplary embodiment, the means 1306 for determining resources available within a time window may comprise the UE 650 (FIG. 6) determining available transmission resources during a time window $[n+T_1, n+T_2]$, as described above, using, for example, the controller/processor 659, the RX processor 656, the TX processor 668, and the resource selection logic 670 of FIG. 6.

The apparatus 1300 further comprises means 1308 for ranking the available resources. In certain embodiments, the means 1308 for ranking the available resources can be configured to perform one or more of the functions described in operation block 1208 of method 1200 (FIG. 12). In an exemplary embodiment, the means 1308 for ranking the available resources may comprise the UE 650 (FIG. 6) ranking the available transmission resources based on the received energy (S-RSSI (received signal strength indicator)) measurements on average over the sensing period, as described above, using, for example, the controller/processor 659 and the resource selection logic 670 of FIG. 6.

The apparatus 1300 further comprises means 1310 for choosing resources from best candidate resources. In certain embodiments, the means 1310 for choosing resources from best candidate resources can be configured to perform one or more of the functions described in operation block 1210 of method 1200 (FIG. 12). In an exemplary embodiment, the means 1310 for choosing resources from best candidate resources may comprise the UE 650 (FIG. 6) choosing low latency resources from the set $S_B$, as described above, using, for example, the controller/processor 659 and the resource selection logic 670 of FIG. 6.

The apparatus 1300 further comprises means 1312 for selecting the resource. In certain embodiments, the means 1312 for selecting the resource can be configured to perform one or more of the functions described in operation block 1212 of method 1200 (FIG. 12). In an exemplary embodiment, the means 1312 for selecting the resource may comprise the UE 650 (FIG. 6) selecting the resource for transmission, as described above, using, for example, the controller/processor 659 and the resource selection logic 670 of FIG. 6.

The apparatus 1300 further comprises means 1314 for transmitting the packet using the selected resource. In certain embodiments, the means 1314 for transmitting the packet using the selected resource can be configured to perform one or more of the functions described in operation block 1214 of method 1200 (FIG. 12). In an exemplary embodiment, the means 1314 for transmitting the packet using the selected resource may comprise the UE 650 (FIG. 6) transmitting the packet using the selected resource, as described above, using, for example, the controller/processor 659, TX processor 668, the transmitter 654TX, and the resource selection logic 670 of FIG. 6.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
monitoring communication resources in a communication system;
determining a set of candidate resources to use for subsequent transmission of information within a time window such that the time window is minimized based on a desired communication latency parameter that considers at least one or more of communication channel congestion and a priority of the intended transmission;
determining a set of lowest energy resources from the set of candidate resources;
selecting a low energy resource from the set of lowest energy resources; and
transmitting data on the selected low energy resource.

2. The method of claim 1, further comprising minimizing the time window based on a channel busy ratio measurement that is indicative of communication channel congestion.

3. The method of claim 1, further comprising minimizing the time window based on a per packet priority information that is indicative of priority of the subsequent transmission.

4. The method of claim 1, further comprising:
transmitting data corresponding to a plurality of information packets with a plurality of different priorities on the selected low energy resource over time; and
minimizing the time window based on a highest per packet priority of the plurality of different priorities anticipated to be transmitted using the selected low energy resource over time.

5. The method of claim 1, further comprising:
transmitting data corresponding to a plurality of information packets with a plurality of different priorities on the selected low energy resource over time, and
minimizing the time window based on an average per packet priority of the plurality of different priorities anticipated to be transmitted using the selected low energy resource over time.

6. The method of claim 1, further comprising beginning with a minimum time window and then increasing the time window if the size of the set of lowest energy resources is less than a configured threshold (X %) of the size of the set of candidate resources within the time window.

7. The method of claim 1, further comprising selecting the low energy resource from the set of lowest energy resources as the resource that leads to the lowest latency.

8. The method of claim 1, further comprising:
determining occupied resources within the set of candidate resources based on received control information indicating resource reservation information; and
wherein a minimum and a maximum limit on the time window are a function of a usage level based on the energy of remaining candidate resources from the set of candidate resources after excluding occupied resources.

9. An apparatus for communication, comprising:
a user equipment (UE) configured to monitor communication resources in a communication system;
the UE configured to determine a set of candidate resources to use for subsequent transmission of information within a time window such that the time window is minimized based on a desired communication latency parameter that considers at least one or more of communication channel congestion and a priority of the subsequent transmission;

the UE configured to determine a set of lowest energy resources from the set of candidate resources;

the UE configured to select a low energy resource from the set of lowest energy resources; and the UE configured to transmit data on the selected low energy resource.

10. The apparatus of claim 9, wherein the UE is configured to minimize the time window based on a channel busy ratio measurement that is indicative of communication channel congestion.

11. The apparatus of claim 9, wherein the UE is configured to minimize the time window based on a per packet priority information that is indicative of priority of the subsequent transmission.

12. The apparatus of claim 9, wherein the UE is configured to:

transmit data corresponding to a plurality of information packets with a plurality of different priorities on the selected low energy resource over time; and minimize the time window based on at least one of a highest per packet priority of the plurality of different priorities anticipated to be transmitted using the selected low energy resource over time and an average per packet priority of the plurality of different priorities anticipated to be transmitted using the selected low energy resource over time.

13. The apparatus of claim 9, wherein the UE is configured to begin with a minimum time window and then increase the time window if the size of the set of lowest energy resources is less than a configured threshold (X %) of the size of the set of candidate resources within the time window.

14. The apparatus of claim 9, wherein the UE is configured to select the low energy resource from the set of lowest energy resources as the resource that leads to the lowest latency.

15. The apparatus of claim 9, wherein the UE is configured to:

determine occupied resources within the set of candidate resources based on received control information indicating resource reservation information; and wherein a minimum and a maximum limit on the time window are a function of a usage level based on the energy of remaining candidate resources from the set of candidate resources after excluding occupied resources.

16. An apparatus for communication, comprising:

a user equipment (UE) configured to monitor communication resources in a communication system;

the UE configured to determine a set of candidate resources to use for subsequent transmission of information within a time window such that the time window is minimized based on a desired communication latency parameter that considers at least one or more of communication channel congestion and a priority of the subsequent transmission, the time window minimized based on at least one of a channel busy ratio measurement that is indicative of communication channel congestion and a per packet priority information that is indicative of priority of the subsequent transmission;

the UE configured to determine a set of lowest energy resources from the set of candidate resources;

the UE configured to select a low energy resource from the set of lowest energy resources; and the UE configured to transmit data on the selected low energy resource.

17. The apparatus of claim 16, wherein the UE is configured to:

transmit data corresponding to a plurality of information packets with a plurality of different priorities on the selected low energy resource over time; and minimize the time window based on at least one of a highest per packet priority of the plurality of different priorities anticipated to be transmitted using the selected low energy resource over time and an average per packet priority of the plurality of different priorities anticipated to be transmitted using the selected low energy resource over time.

18. The apparatus of claim 16, wherein the UE is configured to begin with a minimum time window and then increase the time window if the size of the set of lowest energy resources is less than a configured threshold (X %) of the size of the set of candidate resources within the time window.

19. The apparatus of claim 16, wherein the UE is configured to select the low energy resource from the set of lowest energy resources as the resource that leads to the lowest latency.

20. The apparatus of claim 16, wherein the UE is configured to:

determine occupied resources within the set of candidate resources based on received control information indicating resource reservation information; and wherein a minimum and a maximum limit on the time window are a function of a usage level based on the energy of remaining candidate resources from the set of candidate resources after excluding occupied resources.

21. A non-transitory computer-readable medium storing computer executable code for communication, the code executable by a processor to:

monitor communication resources in a communication system;

determine a set of candidate resources to use for subsequent transmission of information within a time window such that the time window is minimized based on a desired communication latency parameter that considers at least one or more of communication channel congestion and a priority of the subsequent transmission;

determine a set of lowest energy resources from the set of candidate resources;

select a low energy resource from the set of lowest energy resources; and transmit data on the selected low energy resource.

22. The non-transitory computer-readable medium of claim 21, the code executable by a processor to minimize the time window based on a channel busy ratio measurement that is indicative of communication channel congestion.

23. The non-transitory computer-readable medium of claim 21, the code executable by a processor to minimize the time window based on a per packet priority information that is indicative of priority of the subsequent transmission.

24. The non-transitory computer-readable medium of claim 21, the code executable by a processor to:

transmit data corresponding to a plurality of information packets with a plurality of different priorities on the selected low energy resource over time; and minimize the time window based on at least one of a highest per packet priority of the plurality of different priorities anticipated to be transmitted using the selected low energy resource over time and an average per packet priority of the plurality of different priorities anticipated to be transmitted using the selected low energy resource over time.

25. The non-transitory computer-readable medium of claim 21, the code executable by a processor to begin with a minimum time window and then increase the time window if the size of the set of lowest energy resources is less than a configured threshold (X %) of the size of the set of candidate resources within the time window.

26. The non-transitory computer-readable medium of claim 21, the code executable by a processor to select the low energy resource from the set of lowest energy resources as the resource that leads to the lowest latency.

27. The non-transitory computer-readable medium of claim 21, the code executable by a processor to determine occupied resources within the set of candidate resources based on received control information indicating resource reservation information; and
    wherein a minimum and a maximum limit on the time window are a function of a usage level based on the energy of remaining candidate resources from the set of candidate resources after excluding occupied resources.

* * * * *